E. SACHS.
FREE WHEEL CYCLE HUB WITH BRAKE MECHANISM.
APPLICATION FILED OCT. 2, 1908.
960,710.  Patented June 7, 1910.
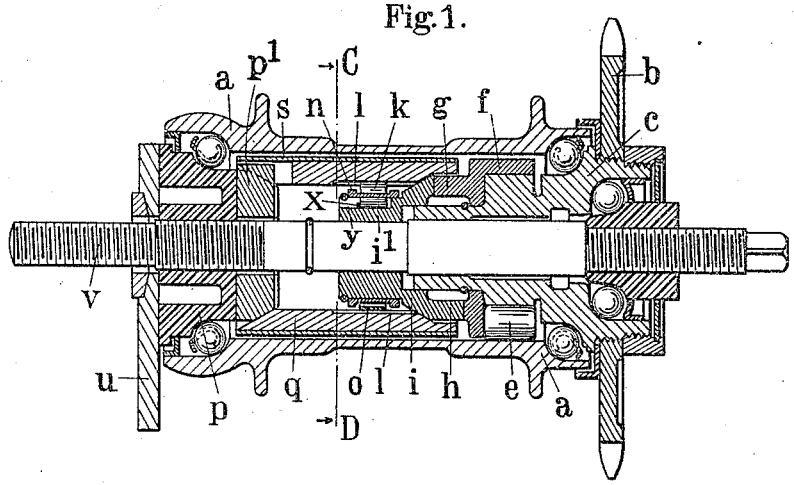
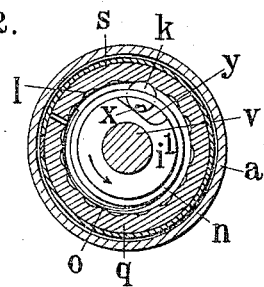
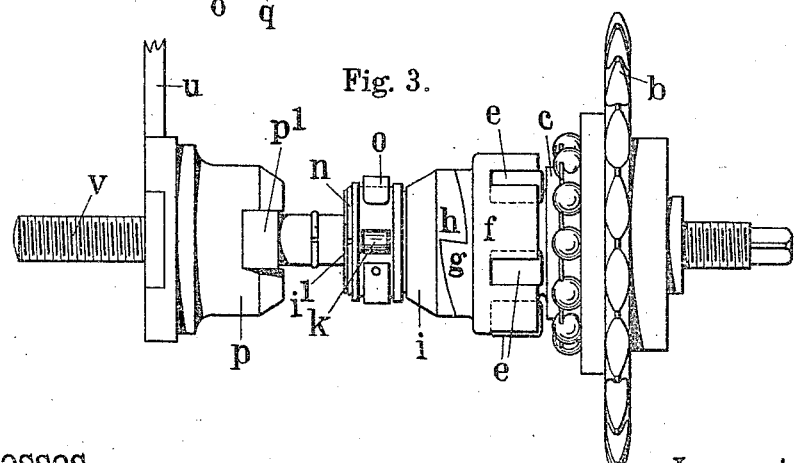
Witnesses
Harry King.
Joseph C. Stack.
Inventor
Ernst Sachs.
By Julian C. Dowell
his Attys.

UNITED STATES PATENT OFFICE.

ERNST SACHS, OF SCHWEINFURT, GERMANY.

FREE-WHEEL-CYCLE HUB WITH BRAKE MECHANISM.

960,710.  Specification of Letters Patent. Patented June 7, 1910.

Application filed October 2, 1908. Serial No. 455,887.

*To all whom it may concern:*

Be it known that I, ERNST SACHS, a subject of the King of Bavaria, residing at No. 24 Schultes street, Schweinfurt, in Germany, have invented a new and useful Improvement in Free-Wheel-Cycle Hubs with Brake Mechanism, of which the following is a specification.

This invention relates to a free-wheel cycle hub with back-pedaling coaster brake, having a driving mechanism and a brake located within the hub-barrel, a clutch device being arranged between the said appliances for the purpose of producing connection of the driving gear with the brake in back-pedaling, or of releasing the driving gear from the brake during propelling of the cycle.

The invention more especially relates to the afore-said clutch mechanism and to the means connected therewith which are capable of controlling the working of all parts rotatable within the hub, and of producing the throwing into and out of gear of the driving clutch as well as the brake clutch in a reliable manner.

The object of the invention is to provide a clutch mechanism which is not only adapted to prevent rotation of certain elements of the driving gear, which transmit the power to the brake, but exerts influence on the driving clutch in such a manner that it will be brought into its several positions, as will be required in the operation of the entire free-wheel mechanism. These objects are attained by the arrangement of a drag or checking spring working against a fixed part of the device and being connected to the power-transmitting part, whereby its rotation with respect to the latter is permitted within certain limits; a ratchet or pawl clutch is also controlled by the movement of the spring, so that the said friction spring, when throwing the driving clutch into or out of gear, disconnects and engages the brake clutch at the same time. A mechanism adapted to attain these objects is illustrated by way of example in the accompanying drawing forming a part of this specification, and in which is—

Figure 1 a longitudinal sectional elevation of the hub barrel and of the entire gear arranged therein, Fig. 2 a cross-section on the line C—D of Fig. 1, and Fig. 3 a side elevation of the gear which is contained in the barrel, except the brake-sleeve.

Like reference letters designate like parts throughout all figures of the drawing.

A driving sleeve $c$ situated within the hub-barrel $a$ and rotatably arranged on the fixed axle $v$, carries at one end the sprocket-wheel $b$ and is provided in its periphery with pockets having inclined faces, rollers $e$ being located therein opposite to the inner face of the barrel $a$, thus forming a ratchet clutch of the well known construction, which is brought into its operative position by pedaling forward, and disconnected when the barrel is overrunning the driving mechanism. The said rollers $e$ are housed in a guide ring or retainer $f$ loosely arranged upon the sleeve $c$, which spaces the rollers in proper distances from each other and moves the same in synchronism. Axially projecting teeth $g$ and $h$ having beveled contacting faces are provided at the opposite ends of the guide ring $f$ and an intermediate annular clutch body $i$ slipped on to the axle $v$ and being rotatable and displaceable thereon in the axial direction. A conical face provided on the periphery of the clutch-ring $i$ is adjoined by a corresponding concave conical face formed in the confronting end of a hollow cylindrical brake body $q$ covered with a braking surface or mantle $s$ of any convenient braking material. The other end of the sleeve $q$ internally tapered in the same manner, rests upon the conical end of the ball cone $p$ which is prevented from rotation by means of an arm $u$ fixed to the frame of the cycle. A key $p^1$ attached to the cone $p$ and engaging a slot in the sleeve $q$ permits of its longitudinal displacement, but precludes rotation of the same. Each of the cylindrical bodies $q$ and $s$ which are connected with one another by suitable means, being split lengthwise, an expansive brake-shoe is provided which will be opened or expanded and pressed upon the inner circumference of the hub $a$, when in back-pedaling the clutch ring $i$ is forced into the sleeve $q$ by the operation of the beveled teeth $g$ and $h$, the cone $p$ exerting a similar wedging effect at the same time.

On a cylindrical projection $i^1$ of the ring $i$ is formed a peripheral depression or pocket $y$ having an inclined face ascending in the direction of the forward rotation of the gear (see arrow in Fig. 2); a roller $k$ placed in the pocket $y$ projects through a perforation of a retaining-ring $n$ and is prevented from falling out by a pin or a boss $x$ provided thereon. The retainer $n$ which is secured upon the part $i^1$ in any suitable manner, for example as shown, by a spring ring sprung into a circumferential groove of the part $i^1$, is loosely arranged upon its carrier but its rotation with respect to the same is limited by the roller $k$ in its extreme positions at the ends of the pocket $y$. A flat spring $o$ bent in circular shape and having one end fastened to the retainer $n$ works with its free extremity against the inner periphery of the sleeve $q$, in which are formed longitudinal grooves $l$.

The operation of the device is as follows: When the rider pedals forward for propelling the cycle, the rollers $e$ together with their guide ring are retained by the intervention of the ring $i$, which is in engagement with the ring $f$, through the resistance produced by the friction of the spring $o$ which slides on the inner periphery of the sleeve $q$. The clutch rollers $e$ will therefore be jammed between the inclined faces of their pockets and the confronting face of the hub-barrel $a$, so that the rear wheel is now coupled with the driving gear. The roller $k$ is then held at the deeper end of the pocket $y$ and not in contact with the sleeve $q$, and it drags the spring $o$ along with it. When the pedals are held at rest the barrel $a$ overrunning the sleeve $c$ will produce disengagement of the ratchet clutch $e$, while the other parts of the gear inclosed in the barrel remain inoperative. In the backward rotation of the sleeve $c$ the guide ring $f$ will be coupled therewith through the rollers $e$, so that the ring $i$ is axially displaced to the left by the operation of the teeth $g$, $h$, and forced into the sleeve $q$, as it has been coupled to this non-rotatable sleeve through the intermediation of the roller $k$ by slightly rotating backward, i. e. the roller $k$ held at its respective place by the spring $o$ will be moved outward upon the inclined bottom of the pocket $y$ and engaged in a groove $l$ of the sleeve $q$ (Fig. 2), thus fixing the ring $i$ against rotation, but allowing its displacement along and upon the axle, whereby the brake is applied, as will easily be understood from the foregoing description.

It is obvious that the device may be varied in different ways without departing from the principle of the invention. It is only essential that the friction spring works against a fixed part of the gear and that a pawl-like element is adjusted and moved into its operating and inoperative positions by the said spring which must be movable with respect to the driving gear within certain limits. Instead of the described elements equivalent mechanisms may be employed. I, therefore, do not wish to be confined to the construction illustrated and described for purpose of example, but

What I claim as my invention, and desire to secure by Letters Patent, is—

1. In a free wheel cycle hub the combination with driving means, of a brake for the wheel, and means interposed between said brake and the driving means and operatable to actuate said brake, said interposed means including a rotatable member adapted to engage said brake and operatable to throw it into braking contact with the hub and a clutch interposed between said rotatable member and said brake and adapted to lock the two together when the former actuates the latter.

2. In a free wheel cycle hub, the combination with means for driving the hub, of a brake-member operatable to brake the hub, said member being normally inoperative, a member connected to the driving means to rotate therewith and adapted when rotated backward to engage and throw said brake-member into braking contact with the hub, and a clutch means between said member and the brake-member and adapted to lock them together when the former is rotated backward.

3. In a free wheel cycle hub, the combination with a driving element, of a sleeve connected to said element to rotate therewith, a ring mounted to rotate on said sleeve, rolling means carried by said sleeve and ring and adapted to be forced by said sleeve into locking engagement with the hub on forward rotation of said driving element, a brake-sleeve adapted to be forced into contact with the hub, a member for actuating said brake, said member having clutch-tooth engagement with the sleeve connected to the driving element, and a spring interposed between said brake-sleeve and its actuating member, said spring being adapted to hold back said ring to have the rolling means therein engaged with the hub.

4. In a free-wheel cycle hub, the combination with a driving gear, of a brake mechanism, including fixed parts and a rotatable member which is in engagement with the driving gear, a clutch means provided on the said rotatable member and adapted to clutch it to said fixed part, and means movable with respect to the said rotatable member and engaging the clutch means and being in frictional engagement with fixed parts of the hub, thereby insuring operation of the clutch means.

5. In a free-wheel cycle hub, the combination with a driving gear, of a brake mechanism including a fixed part and a rotatable part, clutching means arranged between the rotatable part and the fixed part of the hub, and means movable with respect to the said fixed and rotatable parts and adapted to dispose said clutching means angularly with reference to the rotatable part.

6. In a free-wheel cycle hub, the combination with a driving gear, of a brake mechanism including fixed parts and a rotatable and axially displaceable part which is in positive engagement with the driving gear, a clutching element arranged between the fixed parts and the said rotatable and axially displaceable member of the brake and carried by the latter, and means adjustable with respect to the said rotatable and axially displaceable brake member, so as to control the position of the clutching element, which means are in frictional engagement with the fixed parts of the hub.

7. In a free-wheel cycle hub, the combination with a driving gear, of a brake mechanism, including a fixed part of the hub and a rotatable and axially displaceable part, a ratchet-like clutch means attached to said rotating and axially displaceable part opposite to said fixed part of the hub, and a friction member carried by the said rotatable part, and movable with respect to the latter and being also in engagement with the ratchet-like clutch so as to adjust it, the said friction member acting against a non-rotatable part of the hub.

8. In a free-wheel cycle hub, the combination with a driving gear, of a brake mechanism including a fixed part and a rotatable wedge-shaped member for applying the brake, said member being in positive connection with the driving gear, a ratchet-like clutching element attached to and movable on the said member opposite to said fixed part of the hub, and a friction-spring having connection with said clutching element and movable with respect to the rotatable member, its free extremity acting against said fixed part of the hub.

9. In a free-wheel cycle hub, the combination with a driving gear, of a roller clutch adapted to operatively connect the hub barrel and driving gear, said clutch including a guide ring for the rollers, a brake mechanism comprising a non-rotatable brake sleeve and a rotatable and axially displaceable wedge-shaped member, the said member having positive operating connection with the guide ring, a ratchet-like clutching member provided on the said member opposite to a fixed part of the hub and adapted to lock the two together, and a friction spring movable with respect to the said rotatable member and adapted to adjust the clutching member, the free extremity of the spring acting against the brake sleeve.

10. In a free-wheel cycle hub, the combination with a driving gear, of a brake mechanism comprising a fixed brake sleeve and a rotatable and axially displaceable wedge-shaped member adapted to expand the brake sleeve, means operatively connecting the said member with the driving gear, a rolling clutch means provided on the said member opposite to said fixed brake sleeve of the hub and adapted to lock the two together, there being grooves in the said fixed part for the engagement of the clutch means, and a friction spring movable with respect to the said rotatable member and adapted to adjust said clutch means, the free extremity of the spring acting against a non-rotatable part of the hub.

11. In a free-wheel cycle hub, the combination with a driving mechanism including a fixed part and a rotatable part, of a brake mechanism, and a clutch means, comprising a cylindric body located in an inclined recess of said rotatable part opposite to said fixed part of the mechanism and adapted to lock the two together, and a friction spring acting against said fixed part of the mechanism and being in engagement with the cylindric body, the said body and the friction spring being movable within limits upon said rotatable part.

12. In a free-wheel cycle hub, the combination with a driving mechanism, of a brake mechanism including a fixed part and a rotatable part, and a clutch, comprising a roller arranged upon said rotatable part opposite to said fixed part and adapted to lock them together, grooves being provided in the said fixed part for the engagement of said roller, and an inclined groove being provided in said rotatable part for the roller, and a friction member having an annular body movable on the said rotatable part and being in engagement with the roller, so as to adjust the same, and an elastic portion working against a fixed part of the mechanism and attached at one end to said friction member.

In testimony whereof I have set my signature to this specification in the presence of two subscribing witnesses.

ERNST SACHS.

Witnesses:
AUGUST FUZZER,
ROBERT W. HEINGARTNER.